(12) United States Patent
Fukushima

(10) Patent No.: US 7,695,636 B2
(45) Date of Patent: Apr. 13, 2010

(54) WORKING FLUID FOR HEAT CYCLE, RANKINE CYCLE SYSTEM, HEAT PUMP CYCLE SYSTEM AND REFRIGERATION CYCLE SYSTEM

(75) Inventor: Masato Fukushima, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/210,495

(22) Filed: Sep. 15, 2008

(65) Prior Publication Data

US 2009/0008599 A1 Jan. 8, 2009

Related U.S. Application Data

(63) Continuation of application No. PCT/JP2007/054953, filed on Mar. 13, 2007.

(30) Foreign Application Priority Data

Mar. 14, 2006 (JP) ............... 2006-069128

(51) Int. Cl.
C09K 5/00 (2006.01)
C09K 5/04 (2006.01)

(52) U.S. Cl. ............... 252/69; 262/67; 262/68; 262/73; 262/70; 262/71

(58) Field of Classification Search ........... 252/67, 252/68, 69, 73, 70, 71
See application file for complete search history.

(56) References Cited

U.S. PATENT DOCUMENTS

| | | | |
|---|---|---|---|
| 6,526,764 B1 * | 3/2003 | Singh et al. ........... | 62/84 |
| 7,163,645 B2 * | 1/2007 | Hanada et al. ........... | 252/364 |
| 2005/0156134 A1 * | 7/2005 | Minor et al. ........... | 252/67 |
| 2006/0242985 A1 * | 11/2006 | Leck et al. ........... | 62/323.1 |
| 2007/0235681 A1 * | 10/2007 | Fukushima ........... | 252/67 |

FOREIGN PATENT DOCUMENTS

| | | |
|---|---|---|
| CN | 101124437 A | 2/2008 |
| JP | 61-255978 | 11/1986 |
| JP | 7-504889 | 6/1995 |
| JP | 10-506926 | 7/1998 |
| JP | 2881195 | 2/1999 |
| JP | 11-279098 | 10/1999 |
| JP | 2002-543363 | 12/2002 |
| JP | 2006-169290 | 6/2006 |
| JP | 2006-307170 | 11/2006 |
| WO | 02/26912 | 4/2002 |
| WO | WO 2006/054776 A1 | 5/2006 |

OTHER PUBLICATIONS

Akira Sekiya, et al., "The potential of hydrofluoroethers to replace CFCs, HCFCs and PFCs", Journal of Fluorine Chemistry 101, (2000), pp. 215-221.

* cited by examiner

*Primary Examiner*—Mark Eashoo
*Assistant Examiner*—Jane L Stanley
(74) *Attorney, Agent, or Firm*—Oblon, Spivak, McClelland, Maier & Neustadt, L.L.P.

(57) ABSTRACT

A working fluid for a heat cycle containing at least 90 mass % of 1,1,2,2- tetrafluoroethyl-2,2,2-trifluoroethyl ether (HFE-347) and a $C_{1-4}$ alcohol is provided. A Rankine cycle system, a heat pump cycle system and a refrigeration cycle system using the working fluid for a heat cycle of the present invention is also provided.

13 Claims, 5 Drawing Sheets

WORKING FLUID FOR HEAT CYCLE, RANKINE CYCLE SYSTEM, HEAT PUMP CYCLE SYSTEM AND REFRIGERATION CYCLE SYSTEM

TECHNICAL FIELD

The present invention relates to a working fluid for a heat cycle, and a Rankine cycle system, a heat pump cycle system and a refrigeration cycle system, using such a working fluid.

BACKGROUND ART

There has been a progress in the technology to recover energies from heat sources in an intermediate or low temperature range lower than the temperature obtained by combustion of fuels such as heavy oil, petroleum oil, etc., and power generation by ocean thermal energy conversion, geothermal binary power generation, waste heat recovery power generation, solar thermal power generation, heating by a heat pump, heat exchange by a heat pipe, etc., have been practically used or tested.

As a working fluid to be used for such power generation, heat pumps, etc., water, a hydrocarbon such as propane or butane, a fluorocarbon such as trichlorofluoromethane (CFC-11), dichlorodifluoromethane (CFC-12), chlorodifluoromethane (HCFC-22), trichlorotrifluoroethane (CFC-113) or dichlorotetrafluoroethane (CFC-114), or ammonia, may, for example, be known.

Ammonia and hydrocarbons have some restrictions in their commercial use in view of the safety problem such as toxicity, inflammability or corrosiveness or for such a reason that the energy efficiency is poor.

Many of fluorocarbons have merits such that they have little toxicity and are non-flammable and chemically stable, and various fluorocarbons having different normal boiling points are readily available, and thus, they are expected to be useful as working fluids, and evaluation and researches of fluorocarbons are being actively carried out.

However, among fluorocarbons, compounds containing chlorine atoms are considered to have a nature to remain in the environment or to have a relation to depletion of ozone layer, and their stepwise reduction and total ban are being endeavored. For example, chlorofluorocarbons (CFC) containing chlorine atoms and having all hydrogen atoms halogenated have already been completely banned in advanced countries like Japan, USA and European countries. Further, with respect to hydrochlorofluorocarbons (HCFC) containing hydrogen atoms, reduction towards the total ban in 2020 is being endeavored in advanced countries. Further, perfluorocarbons (PFC) and hydrofluorocarbons (HFC) contain no chlorine atom and therefore are free from an influence to ozone layer, but their influence to the global warming has been pointed out, and they are designated as compounds for global warming, the discharge of which to the atmosphere should be controlled.

As a compound or composition which is non-flammable and little influential over the environment, the following ones have been proposed.

(1) An azeotropic composition comprising a hydrofluoroether of the formula $C_2F_nH_{(6-n)}O$ (wherein n is from 2 to 5) and a hydrofluorocarbon of the formula $C_xF_nH_{(2x+2-n)}$ (wherein x is from 1 to 3, and n is from 2 to 7) (Patent Document 1).

(2) A hydrofluoroether of the formula $C_aF_bH_{2a+2-b}O_c$ (wherein a is from 3 to 6, b is from 1 to 14, and c is 1 or 2) or a non-cyclic hydrofluorocarbon of the formula $C_dF_eH_{2d+2-e}$ (wherein d is from 4 to 6 and e is from 1 to 14) (Patent Document 2).

The hydrofluoroether in (1) has a low normal boiling point and a low critical temperature, and accordingly, in a case where such a compound is used as a working fluid, in power recovery by a Rankine cycle from an intermediate or high temperature heat source with a waste heat temperature exceeding 100° C., or with a heat pump intended to supply hot water at a withdrawal temperature of about 100° C., the operation pressure tends to be a high pressure, and at the same time, depending upon the operation conditions, a cycle exceeding the critical temperature will be formed. Therefore, there will be a problem such that the efficiency deteriorates, and the instruments tend to be expensive, such being poor in practical applicability.

Patent Document 2 discloses that the compound in (2) is useful for e.g. a refrigerant, a cleaning agent, aerosol propellant, a fire extinguisher, a blowing agent or a working fluid for power. And, in Patent Document 2, as the hydrofluoroether, $CHF_2CH_2OCF_2CF_3$ (347mcfEβγ) or $CHF_2OCH_2CF_2CF_3$ (347mcfEγδ) is, for example, mentioned.

However, in Patent Document 2, a centrifugal refrigerator is the sole example wherein the hydrofluoroether is used as a working fluid, and there is no disclosure about a specific performance in a Rankine cycle system or a heat pump cycle system.

Further, in Patent Document 2, the chemical name for 347mcfEβγ is disclosed to be "1,1,2,2-tetrafluoro-1-(2,2,2-trifluoroethoxy)-ethane". However, as is evident from the following chemical formulae and the boiling points, 347mcfEβγ and 1,1,2,2-tetrafluoro-1-(2,2,2-trifluoroethoxy)-ethane (hereinafter sometimes referred to as HFE-347) are different compounds.

347mcfEβγ: $CHF_2CH_2OCF_2CF_3$, boiling point: 45.4° C.
HFE-347: $CHF_2CF_2OCH_2CF_3$, boiling point: 56° C.

Thus, the chemical name of 347mcfEβγ in Patent Document 2 is apparently erroneous, and the disclosure in Patent Document 2 does not suggest the possibility of HFE-347 as a working fluid.

Patent Document 1: JP-A-7-504889
Patent Document 2: JP-A-10-506926

DISCLOSURE OF THE INVENTION

Object to be Accomplished by the Invention

Accordingly, it is an object of the present invention to provide a working fluid for a heat cycle, which is nonflammable, little influential to the environment and excellent in heat cycle characteristics, and a Rankine cycle system, a heat pump cycle system and a refrigeration cycle system, which have high capacity and efficiency.

Means to Accomplish the Object

Namely, the present invention provides the following.
(1) A working fluid for a heat cycle, characterized by containing at least 90 mass % of 1,1,2,2-tetrafluoroethyl-2,2,2-trifluoroethyl ether (HFE-347).
(2) The working fluid for a heat cycle according to the above (1), which further contains less than 10 mass % of a $C_{1-4}$ alcohol in the working fluid.
(3) The working fluid for a heat cycle according to the above (1) or (2), which further contains at most 5 mass % of a stabilizer in the working fluid.

(4) The working fluid for a heat cycle according to the above (3), wherein the stabilizer is at least one member selected from the group consisting of an oxidation resistance improving agent, a heat resistance improving agent and a metal deactivator.
(5) A Rankine cycle system using the working fluid for a heat cycle as defined in any one of the above (1) to (4).
(6) A heat pump cycle system using the working fluid for a heat cycle as defined in any one of the above (1) to (4).
(7) A refrigeration cycle system using the working fluid for a heat cycle as defined in any one of the above (1) to (4).

EFFECTS OF THE INVENTION

The working fluid for a heat cycle of the present invention is nonflammable, little influential to the environment and excellent in heat cycle characteristics.

The Rankine cycle system of the present invention has a high power generation capacity and a high Rankine cycle efficiency.

The heat pump cycle system of the present invention has a high heat pump capacity and a high heat pump cycle efficiency.

The refrigeration cycle system of the present invention has a high refrigeration capacity and a high refrigeration cycle efficiency.

MEANINGS OF SYMBOLS

Figure 1:
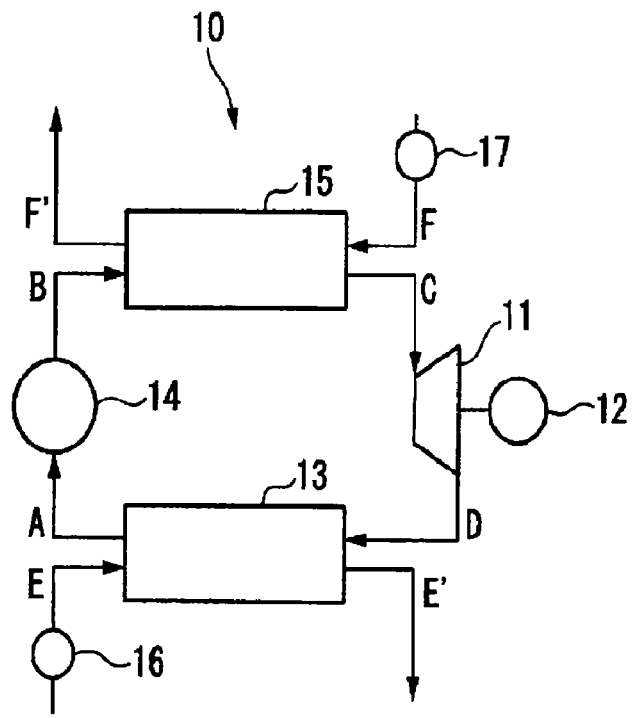
FIG. 1 is a schematic diagram illustrating an embodiment of the Rankine cycle system of the present invention.

10: Rankine cycle system
20: Heat pump cycle system

BEST MODE FOR CARRYING OUT THE INVENTION

Working Fluid

The working fluid for a heat cycle of the present invention contains HFE-347. This HFE-347 is nonflammable, little influential to the environment and excellent in heat cycle characteristics.

The content of HFE-347 is at least 90 mass %, preferably at least 95 mass %, particularly preferably at least 98 mass %, in the working fluid (100 mass %).

The working fluid for a heat cycle of the present invention may contain a $C_{1-4}$ alcohol or a compound which is commonly used as a working fluid, refrigerant or heat transfer medium, other than HFE-347 (hereinafter, such an alcohol and compound will generally be referred to as other compounds). Such other compounds may, for example, be a chlorocarbon such as methylene chloride or trichloroethylene; HCFC such as 1,1-dichloro-2,2,2-trifluoroethane, 1,1-dichloro-1-fluoroethane, 3,3-dichloro-1,1,1,2,2-pentafluoropropane or 3,3-dichloro-1,1,2,2,3-pentafluoropropane; HFC such as difluoromethane, 1,1,1,2-tetrafluoroethane, 1,1,1-trifluoroethane, 1,1-difluoroethane, 1,1,1,2,3,3,3-heptafluoropropane, 1,1,1,3,3,3-hexafluoropropane, 1,1,1,3,3-pentafluoropropane, 1,1,2,2,3-pentafluoropropane, 1,1,1,3,3-pentafluorobutane, 1,1,1,2,2,3,4,5,5,5-decafluoropentane or 1,1,2,2,3,3,4-heptafluorocyclopentane; perfluoropropyl methyl ether $(C_3F_7OCH_3)$, perfluorobutyl methyl ether $(C_4F_9OCH_3)$, and perfluorobutyl ethyl ether $(C_4F_9OC_2H_5)$.

Further, as alcohols as other compounds, $C_{1-4}$ alcohols may be mentioned, and particularly preferred is, for example, methanol, ethanol or isopropanol.

The content of such other compounds may be within a range not to substantially lower the effects of the present invention, and it is usually less than 10 mass %, preferably at most 5 mass %, in the working fluid (100 mass %).

HFE-347 has a sufficiently high stability against heat and oxidation. However, in order to further increase the stability against heat and oxidation, the working fluid of the present invention preferably contains a stabilizer such as an oxidation resistance-improving agent, a heat resistance-improving agent or a metal deactivator.

The oxidation resistance-improving agent and the heat resistance improving agent may, for example, be N,N'-diphenylphenylenediamine, p-octyldiphenylamine, p,p'-dioctyldiphenylamine, N-phenyl-1-naphthylamine, N-phenyl-2-naphtylamine, N-(p-dodecyl)phenyl-2-naphthylamine, di-1-naphthylamine, di-2-naphthylamine, N-alkylphenothiazine, 6-(t-butyl)phenol, 2,6-di-(t-butyl)phenol, 4-methyl-2,6-di-(t-butyl)phenol and 4,4'-methylenebis(2,6-di-t-butylphenol). Such oxidation-improving agents and heat resistance improving agents may be used alone or in combination as a mixture of two or more of them.

The metal deactivator may, for example, be imidazole, benzimidazole, 2-mercaptobenzothiazole, 2,5-dimethylcaptothiadiazole, salicylidine-propylenediamine, pyrazole, benzotriazole, tolutriazole, 2-methylbenzamidazole, 3,5-dimethylpyrazole, methylenebis-benzotriazole, organic acids or their esters, a primary, secondary or tertiary aliphatic amine, an amine salt of an organic or inorganic acid, a heterocyclic nitrogen-containing compound, an amine salt of an alkyl phosphate, or derivatives thereof.

The content of the stabilizer is preferably at most 5 mass %, particularly preferably at most 1 mass %, in the working fluid (100 mass %).

Rankine Cycle System

A Rankine cycle system is a system wherein in an evaporator, a working fluid is heated by e.g. geothermal energy, solar heat or waste heat in an intermediate or high temperature range of from about 50 to 200° C., and the working fluid which became a vapor in a high temperature high pressure state is subjected to adiabatic expansion in an expansion machine, whereby a power generator is driven by the work generated by the adiabatic expansion thereby to carry out power generation.

FIG. 1 is a schematic diagram illustrating one embodiment of the Rankine cycle system of the present invention. The Rankine cycle system 10 is a system generally comprising an expansion machine 11 wherein a working fluid vapor C at a high temperature under high pressure is expanded to form a working fluid vapor D at a low temperature under low pressure, a power generator to be driven by the work generated by the adiabatic expansion of the working fluid vapor C in the expansion machine 11, a condenser 13 wherein the working fluid vapor D discharged from the expansion machine 11 is cooled and liquefied to form a working fluid A, a pump 14 to pressurize the working fluid A discharged from the condenser 13 to form a working fluid B under high pressure, an evaporator 15 to heat the working fluid B discharged from the pump 14 to form a high temperature high pressure working fluid vapor C, a pump 16 to supply a fluid E to the condenser 13, and a pump 17 to supply a fluid F to the evaporator 15.

In the Rankine cycle system 10, the following cycle is repeated.

(i) The high temperature high pressure working fluid vapor C discharged from the evaporator 15 is expanded by the expansion machine 11 to form a low temperature low pressure working fluid vapor D. At that time, the power generator 12 is driven by the work generated by adiabatic expansion of the working fluid vapor C in the expansion is machine 11, to carry out power generation.

(ii) The working fluid vapor D discharged from the expansion machine 11 is cooled and liquefied by the fluid E in the condenser 13 to form a working fluid A. At that time, the fluid E is heated to form a fluid E', which is discharged from the condenser 13.

(iii) The working fluid A discharged from the condenser 13 is pressurized by the pump 14 to form a high pressure working fluid B.

(iv) The working fluid B discharged from the pump 14 is heated by the fluid F in the evaporator 15 to form a high temperature high pressure working fluid vapor C. At that time, the fluid F is cooled and becomes a fluid F', which is discharged from the evaporator 15.

Figure 2:
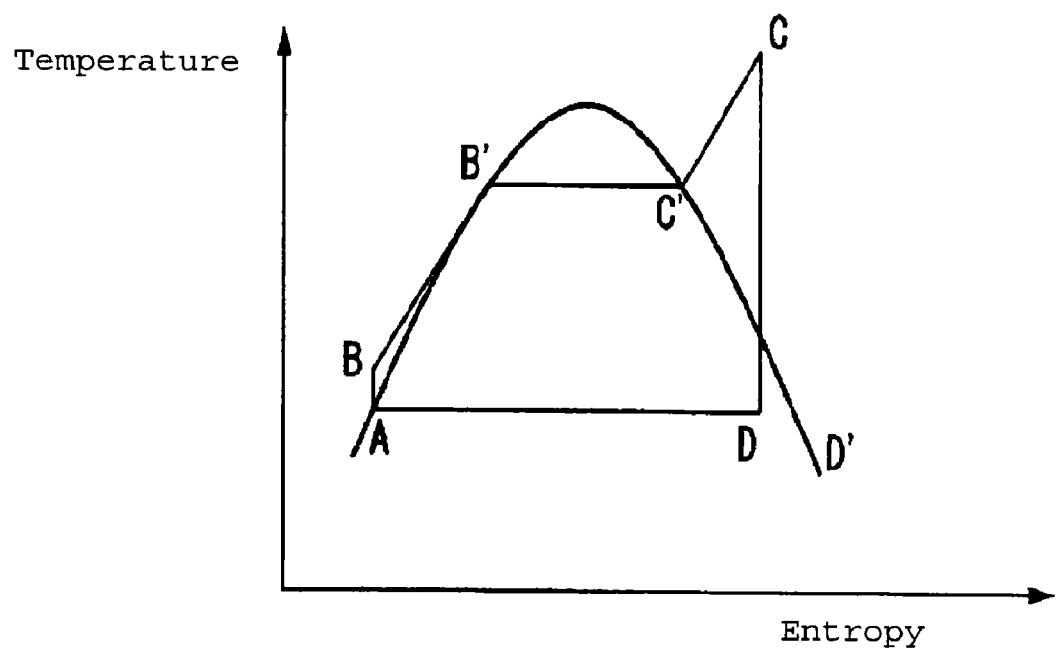
FIG. 2 is a cycle diagram showing the change in state of a working fluid in the Rankine cycle system on a temperature-entropy diagram.

The Rankine cycle system 10 is for a cycle comprising an adiabatic change and an isobaric change, and the change in state of the working fluid may be shown on a temperature-entropy diagram as shown in FIG. 2.

In FIG. 2, the AB'C'D' curve is a saturation line. The AB step is a step of carrying out adiabatic compression by the pump 14 to convert the working fluid A to a high pressure working fluid B. The BB'C'C step is a step of carrying out isobaric heating by the evaporator 15 to convert the high pressure working fluid B to a high temperature high pressure working fluid vapor C.

The CD step is a step of carrying out adiabatic expansion by the expansion machine 11 to convert the high temperature high pressure working fluid vapor C to a low temperature low pressure working fluid vapor D thereby to generate a work. The DA step is a step of carrying out isobaric cooling by the condenser 13 to let the low temperature low pressure working fluid vapor D return to the working fluid A.

Figure 3:
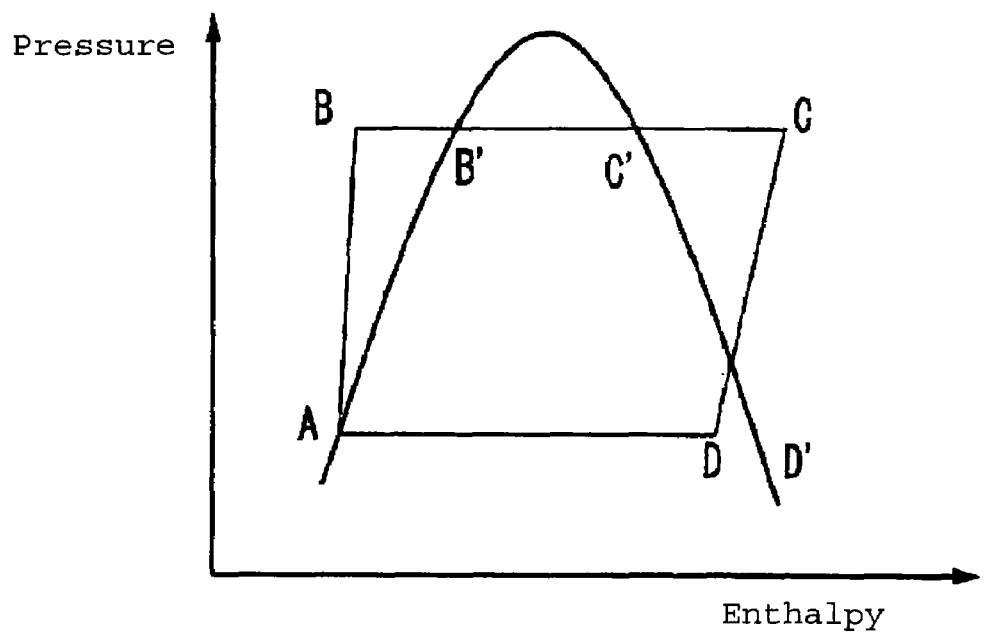
FIG. 3 is a cycle diagram showing the change in state of a working fluid in the Rankine cycle system on a pressure-enthalpy diagram.

Likewise, the change in state of the working fluid may be shown on a pressure-enthalpy diagram as shown in FIG. 3.

Heat Pump Cycle System

The heat pump cycle system is a system wherein a heat energy of a working fluid is given to a load fluid in a condenser to heat the load fluid thereby to raise its temperature to a higher level.

Figure 4:
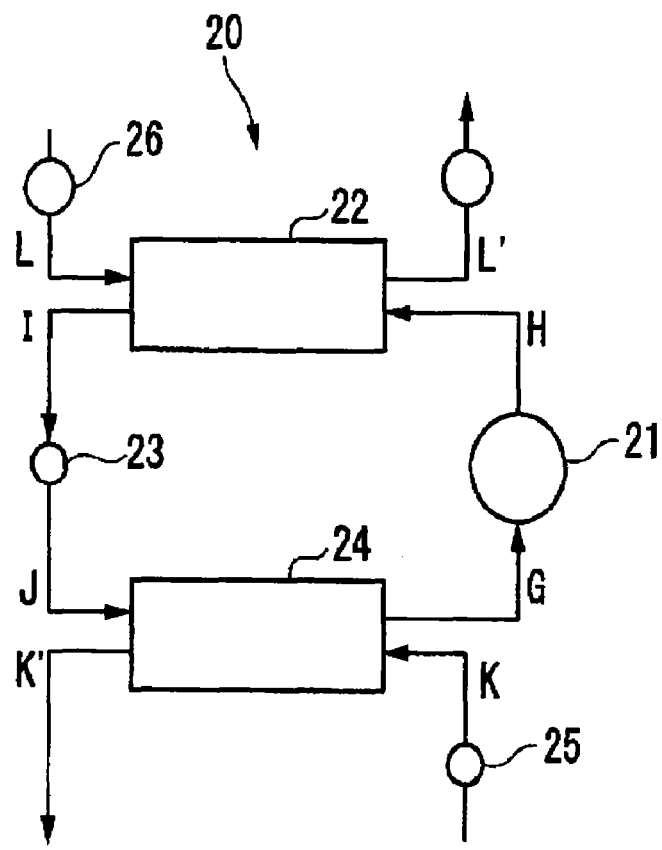
FIG. 4 is a schematic diagram illustrating an embodiment of the heat pump cycle system of the present invention.

FIG. 4 is a schematic diagram illustrating one embodiment of the heat pump cycle system of the present invention. The heat pump cycle system 20 is a system generally comprising a compressor 21 to compress a working fluid vapor G to form a high temperature high pressure working fluid vapor H, a condenser 22 to cool and liquefy the working fluid vapor H discharged from the compressor 21 to form a low temperature high pressure working fluid I, an expansion valve 23 to expand the working fluid I discharged from the condenser 22 to form a low temperature low pressure working fluid J, an evaporator 24 to heat the working fluid J discharged from the expansion valve 23 to form a high temperature low pressure working fluid vapor G, a pump 25 to supply a heat source fluid K to the evaporator 24, and a pump 26 to supply a load fluid L to the condenser 22.

In the heat pump cycle system 20, the following cycle is repeated.

(i) The working fluid vapor G discharged from the evaporator 24 is compressed by the compressor 21 to form a high temperature high pressure working fluid vapor H.

(ii) The working fluid vapor H discharged from the compressor 21 is cooled and liquefied by the load fluid L in the condenser 22 to obtain a low temperature high pressure working fluid I. At that time, the load fluid L is heated and becomes a fluid L', which is discharged from the condenser 22.

(iii) The working fluid I discharged from the condenser 22 is expanded in the expansion valve 23 to obtain a low temperature low pressure working fluid J.

(iv) The working fluid J discharged from the expansion valve 23 is heated by the heat source fluid K in the evaporator 24 to obtain a high temperature low pressure working fluid vapor G. At that time, the heat source fluid K is cooled and becomes a fluid K', which is discharged from the evaporator 24.

Figure 5:
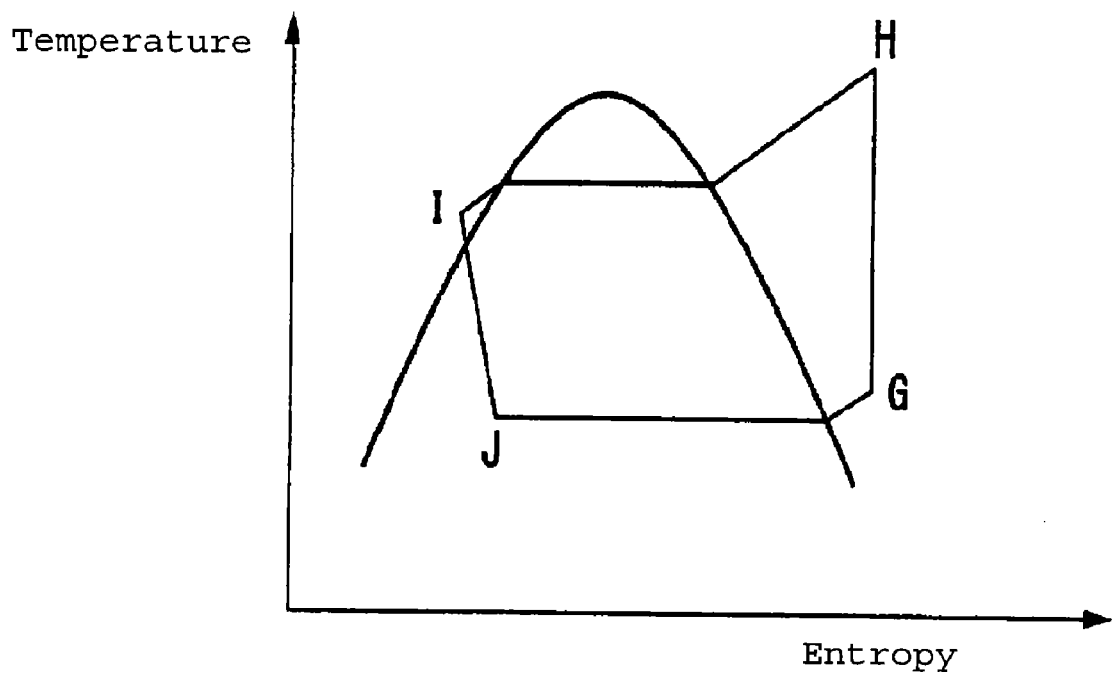
FIG. 5 is a cycle diagram showing the change in state of a working fluid in the heat pump cycle system on a temperature-entropy diagram.

The heat pump cycle system 20 is for a cycle comprising an adiabatic isentropic change, an isenthalpic change and an isobaric change, and the change in state of the working fluid may be shown on a temperature-entropy is diagram as shown in FIG. 5.

In FIG. 5, the GH step is a step of carrying out adiabatic compression by the compressor 21 to convert the high temperature low pressure working fluid vapor G to a high temperature high pressure working fluid vapor H. The HI step is a step of carrying out isobaric cooling by the condenser 22 to convert the high temperature high pressure working fluid vapor H to a low temperature high pressure working fluid I. The IJ step is a step of carrying out isenthalpic expansion by the expansion valve 23 to convert the low temperature high pressure working fluid I to a low temperature low pressure working fluid J. The JG step is a step of carrying out isobaric heating by the evaporator 24 to let the low temperature low pressure working fluid J return to the high temperature low pressure working fluid vapor G.

Figure 6:
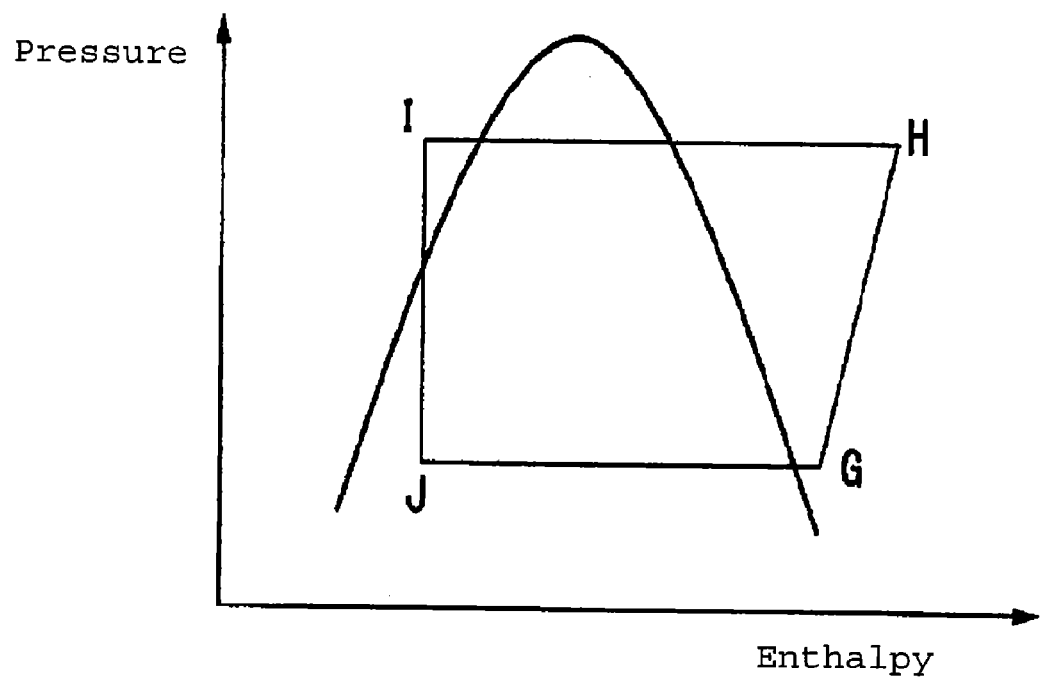
FIG. 6 is a cycle diagram showing the change in state of a working fluid in the heat pump cycle system on a pressure-enthalpy diagram.

Likewise, the change in state of the working fluid may be shown on a pressure-enthalpy diagram as shown in FIG. 6.

Refrigeration Cycle System

A refrigeration cycle system is a system to cool a load fluid to a lower temperature by removing heat energy from the load fluid by a working fluid in an evaporator. As such a refrigeration cycle system, a system similar to the heat pump cycle system 20 in FIG. 4 may, for example, be mentioned.

The working fluid as described above has excellent thermodynamical characteristics (heat cycle characteristics), and when used for e.g. a Rankine cycle system, a heat pump cycle system or a refrigeration cycle system, it is capable of showing an excellent cycle performance (capacity and efficiency). Further, since its efficiency is excellent, it is possible to reduce the power consumption, and since its capacity is excellent, it is possible to reduce the size of the system.

EXAMPLES

Now, the present invention will be described in further detail with reference to Examples. However, it should be understood that the present invention is by no means restricted to such Examples.

Example 1

The power generation capacity and the Rankine cycle efficiency were evaluated in a case where HFE-347 (AE-3000, manufactured by Asahi Glass Company, Limited) was applied to the Rankine cycle system 10 in FIG. 1.

The evaluations were carried out by setting the condensation temperature of the working fluid in the condenser 13 to be 25° C. or 50° C. and changing the maximum temperature of the working fluid in the expansion machine from 60 to 160° C.

Further, it was assumed that there was no pressure loss in the instrument efficiency, piping or heat exchangers.

Enthalpy h in states A to D was calculated based on the following critical constants determined on the basis of actually measured information, the vapor pressure equation, the saturated liquid density equation, the Starling-Han BWR equation of state, the isobaric specific heat in an ideal gas state and various thermodynamic equations.

Here, the critical constants and the coefficients for the vapor pressure equation and the saturated liquid density correlation equation were determined by the method of least squares on the basis of literature-based values or measured values.

The coefficients for the Starling-Han BWR equation required for the calculation of the state quantity in a gas phase region, were calculated by means of a coefficient correlation equation generalized by Starling-Han by using the critical constants and an acentric factor calculated based on the vapor pressure correlation equation.

The isobaric specific heat in an ideal gas state was calculated, based on a physical property estimation technique.

Molecular weight of HFE-347: 200.056

Critical Constants:
Critical temperature ($T_C$): 463.89 K,
Critical pressure ($P_C$): 2.714 MPa,
Critical density ($\rho_C$): 541 kg/m³

VAPOR PRESSURE EQUATION $$\ln\frac{p_s}{p_c} = \frac{T_c}{T}\{a_1\tau + a_2\tau^{1.5} + a_3\tau^3 + a_4\tau^6\}$$

$$\tau = 1 - \frac{T}{T_c}$$

wherein, $p_s$ is the saturated vapor pressure (MPa), T is the temperature (K), $a_1=-8.4816$, $a_2=1.366$, $a_3=-2.639$, and $a_4=-6.2304$.

SATURATED LIQUID DENSITY EQUATION $$\frac{\rho'}{\rho_c} = 1 + b_1\tau^{1/3} + b_2\tau^{2/3} + b_3\tau + b_4\tau^{4/3}$$

$$\tau = 1 - \frac{T}{T_c}$$

wherein $\rho'$ in the saturated liquid density (kg/m³), $b_1=1.746$, $b_2=1.283$, $b_3=-1.434$, and $b_4=1.386$.

STARLING-HAN BWR EQUATION OF STATE $$p = RT\rho + (B_0RT - A_0 - C_0/T^2 + D_0/T^3 - E_0/T^4)\rho^2 +$$
$$(bRT - a - d/T)\rho^3 + \alpha(a + d/T)\rho^6 + (c/T^2)\rho^2(1 + \gamma\rho^2)\exp(-\gamma\rho^2)$$

wherein p is the pressure (kPa), $\rho$ is the density (kg/m³), $B_0=9.239\times10^{-4}$, $A_0=2.9809\times10^{-2}$, $C_0=9107$, $D_0=4.199\times10^5$, $E_0=7.845\times10^6$, $b=2.3867\times10^{-6}$, $a=5.6049\times10^{-5}$, $c=16.27$, $d=9.129\times10^{-3}$, $\alpha=3.088\times10^{-10}$, $\gamma=1.412\times10^{-6}$, and $R=0.04156$ kJ/(kg·K).

ISOBARIC SPECIFIC HEAT IN IDEAL GAS STATE $$C_P^* = c_0 + c_1T + c_2T^2 + c_3T^3$$

wherein $C_P^*$ is the isobaric specific heat (kJ/(kg·K)) in an ideal gas state, T is the temperature (K), $c_0=8.3782\times10^{-2}$, $c_1=3.303\times10^{-3}$, $c_2=-2.721\times10^{-6}$, and $c_3=8.203\times10^{-10}$.

VARIOUS THERMODYNAMIC EQUATIONS $$p = f(v, T)$$

$$h(v, T) = T^2\int_{\infty}^{v}\left[\frac{\partial(p/T)}{\partial T}\right]_v dv + \int_{T_0}^{T} C_p^* dT - R(T - T_0) + pv + h_1$$

$$s(v, T) = \int_{\infty}^{v}\left(\frac{\partial p}{\partial T}\right)_v dv + \int_{T_0}^{T}\frac{C_p^*}{T} dT - r\ln\frac{T}{T_0} + s_1$$

$$C_p = T\int_{\infty}^{v}\left(\frac{\partial^2 p}{\partial T^2}\right)_v dv - T\left(\frac{\partial p}{\partial T}\right)_v^2 \bigg/ \left(\frac{\partial p}{\partial v}\right)_T + C_p^* - R$$

$$C_v = T\int_{\infty}^{v}\left(\frac{\partial^2 p}{\partial T^2}\right)_v dv + C_p^* - R$$

$$a = v\sqrt{-\frac{C_p}{C_v}\left(\frac{\partial P}{\partial V}\right)_T}$$

$$\Delta h_{vp} = T(v'' - v')\frac{dp_s}{dT}$$

$$h' = h'' - \Delta h_{vp}$$

$$s' = s'' - \frac{\Delta h_{vp}}{T}$$

wherein v is the specific volume (m³/kg), h is the enthalpy (kJ/kg), $T_0$ is the temperature (K) at reference state, $h_1$ is a constant (kJ/kg), s is the entropy (kJ/(kg·K)), $s_1$ is a constant (kJ/(kg·K)), $C_p$ is the isobaric specific heat (kJ/(kg·K)), CV is the specific heat at constant volume (kJ/(kg·K)), $\Delta h_{vp}$ is the evaporation latent heat (kJ/kg), v' is the saturated liquid specific volume (m³/kg), v" is the saturated vapor specific volume (m³/kg), h' is the saturated liquid enthalpy (kJ/kg), h" is the saturated vapor enthalpy (kJ/kg), $s_1$ is the saturated liquid entropy (kJ/(kg·K)) and s" is the saturated vapor entropy (kJ/(kg·K)).

The state quantities in the condenser and the evaporator were obtained as follows.

The temperature was specified, and the vapor pressure at that temperature was calculated by using the vapor pressure equation. Then, the density of the saturated liquid at that temperature was calculated by using the saturated liquid density equation. Further, with respect to the density of the saturated vapor, a satisfactory vapor density was calculated by means of a method such as a Newton-Raphson method by applying the temperature and the previously determined vapor pressure to the equation of state. Then, using the obtained temperature, the vapor pressure and the vapor density, the enthalpy and the entropy were calculated by the thermodynamic equation, the equation of state, or the isobaric specific heat equation in an ideal gas state.

The enthalpy and entropy of a saturated liquid were calculated by using the Clausius Clapeyron equation as one of the thermodynamic equations, and the enthalpy and entropy of the saturated vapor, the saturated liquid density, the saturated vapor density and the temperature change value of the vapor pressure (obtainable as a differential coefficient for the vapor pressure equation).

The state quantities in the pump 14 and at the inlet and outlet of the expansion machine 11 were obtained as follows.

By setting the operation pressure and temperature, the density was calculated by a trial and error method by using the equation of state, and then, the enthalpy and entropy were calculated by the above described method (the specific heat value in the ideal gas state and the value obtained by applying the equation of state to the various thermodynamic equations).

Then, using enthalpy h in each state (provided that the suffix of h represents the state of the working fluid), the power generation capacity L was obtained from the following equation (1), and the Rankine cycle efficiency η was obtained from the following equation (2).

$$L = h_C - h_D \quad (1)$$

$\eta$ = effective work/received calorie

= (power generation capacity − pumping work)/recieved calorie

= $\{(h_C - h_D) - (h_B - h_A)\}/(h_C - h_B)$

Here, the pumping work is extremely small as compared with other items, and if it is neglected, the Ranine cycle efficiency will be as follows.

$$\eta = \{(h_C - h_D) - (h_B - h_A)\}/\{(h_C - h_A) - (h_B - h_A)\} \quad (2)$$

$$\approx (h_C - h_D)/(h_C - h_A)$$

Example 2

The power generation capacity and the Rankine cycle efficiency were evaluated in the same manner as in Example 1 except that CFC-113 was used instead of HFE-347.

Figure 7:
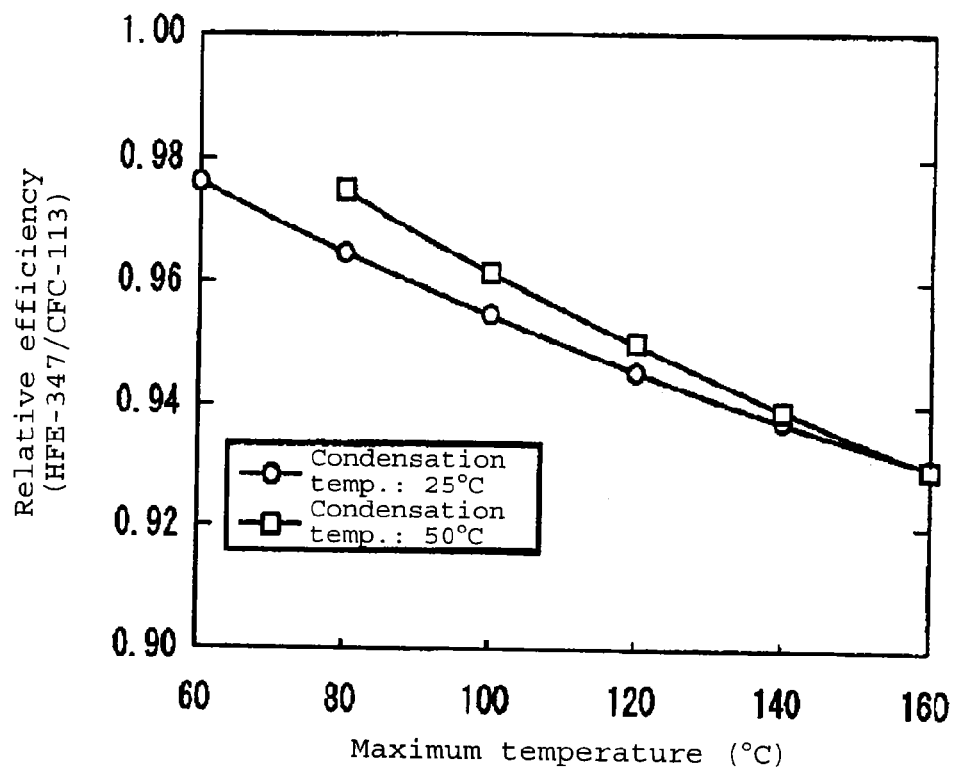
FIG. 7 is a graph showing the relative efficiency (HFE-347/CFC-113) in the Rankine cycle efficiency at each maximum temperature when the condensation temperature is 25° C. or 50° C.

FIG. 7 shows the relative efficiency (HFE-347/CFC-113) of the Ranine cycle efficiency at each maximum temperature when the condensation temperature is 25° C. or 50° C.

Figure 8:
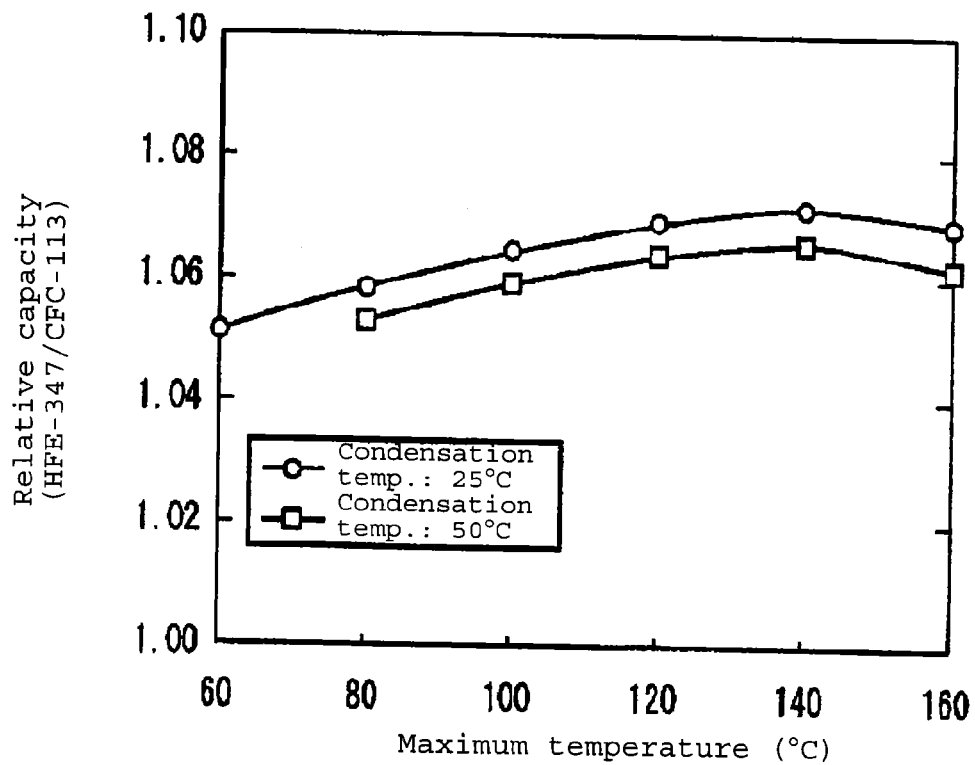
FIG. 8 is a graph showing the relative capacity (HFE-347/CFC-113) in the power generation capacity at each maximum temperature when the condensation temperature is 25° C. or 50° C.

Further, FIG. 8 shows the relative capacity (HFE-347/CFC-113) of the power generation capacity at each maximum temperature when the condensation temperature is 25° C. or 50° C.

From the results in FIG. 8, it was confirmed that HFE-347 is superior to CFC-113 in the power generation capacity under any condition.

On the other hand, from the results in FIG. 7, it was found that HFE-347 shows a slight decrease in the Rankine cycle efficiency as compared with CFC-113, but as is the maximum temperature becomes low, the degree of the decrease in the efficiency decreases.

From the foregoing results, it is evident that although the Rankine cycle efficiency decreases to some extent, the degree of increase in the power generation capacity is large, and thus, HFE-347 is effective as a working fluid in a Rankine cycle system.

Example 3

The heat pump capacity and the heat pump cycle efficiency were evaluated in a case where HFE-347 was applied to the heat pump cycle system 20 in FIG. 4.

An evaluation was carried out by setting the evaporation temperature of the working fluid in the evaporator 24 to be 0° C. and the condensation temperature of the working fluid in the condenser 22 to be 50° C. and changing the supercooling degree of the working fluid in the condenser 22 from 0 to 15° C. Further, an evaluation was carried out by setting the evaporation temperature of the working fluid in the evaporator 24 to be 25° C. and the condensation temperature of the working fluid in the condenser 22 to be 80° C. and changing the supercooling degree of the working fluid in the condenser from 0 to 15° C.

Further, it was assumed that there was no pressure loss in the instrument efficiency, piping or heat exchangers.

The enthalpy h in states G to I was obtained in the same manner as in Example 1.

Then, using the enthalpy h in each state (provided that the suffix of h represents the state of the working fluid), the heat pump capacity Q was obtained from the following formula (3), and the heat pump cycle efficiency η was obtained from the following formula (4).

$$Q = h_H - h_I \quad (3)$$

$\eta$ = heat pump capacity compression work  (4)

= $(h_H - h_I)/(h_C - h_A)$

Example 4

The heat pump capacity and the heat pump cycle efficiency were evaluated in the same manner as in Example 3 except that CFC-113 was used instead of HFE-347.

Figure 9:
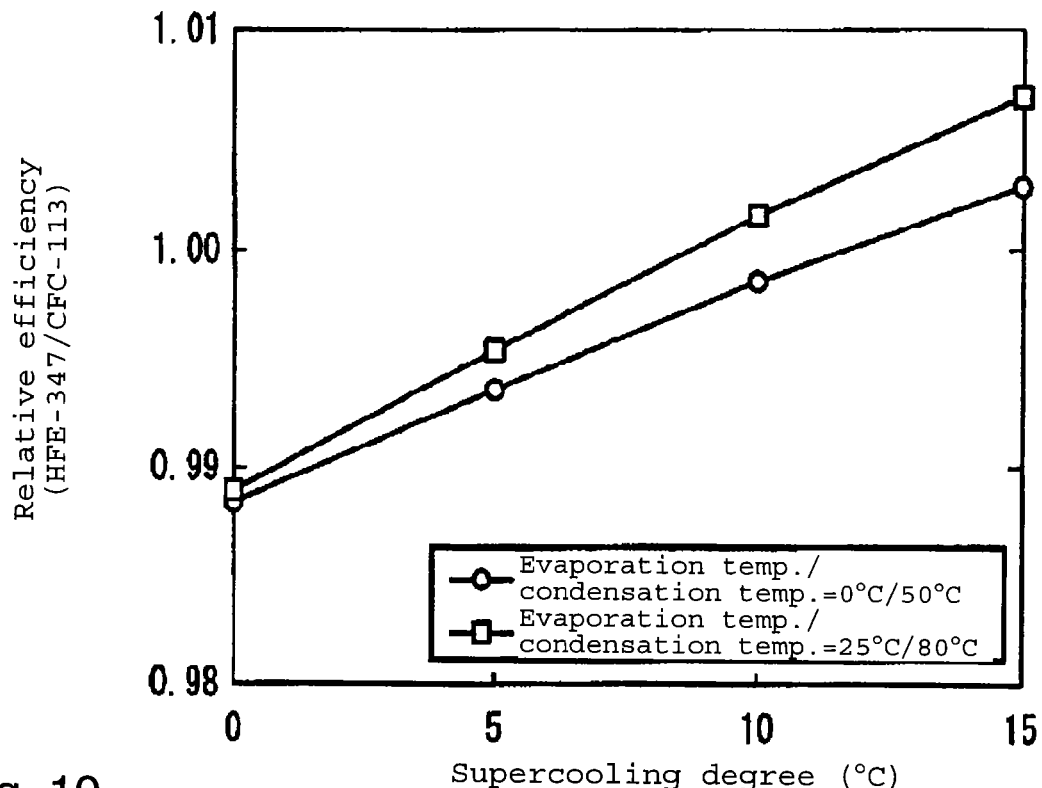
FIG. 9 is a graph showing the relative efficiency (HFE-347/CFC-113) in the heat pump cycle efficiency at each supercooling degree when evaporation temperature/condensation temperature=0° C./50° C. or evaporation temperature/condensation temperature 25° C./80° C.

FIG. 9 shows the relative efficiency (HFE-347/CFC-113) of the heat pump cycle efficiency at each supercooling degree when evaporation temperature/condensation temperature=0° C./50° C., or evaporation temperature/condensation temperature=25° C./80° C.

Figure 10:
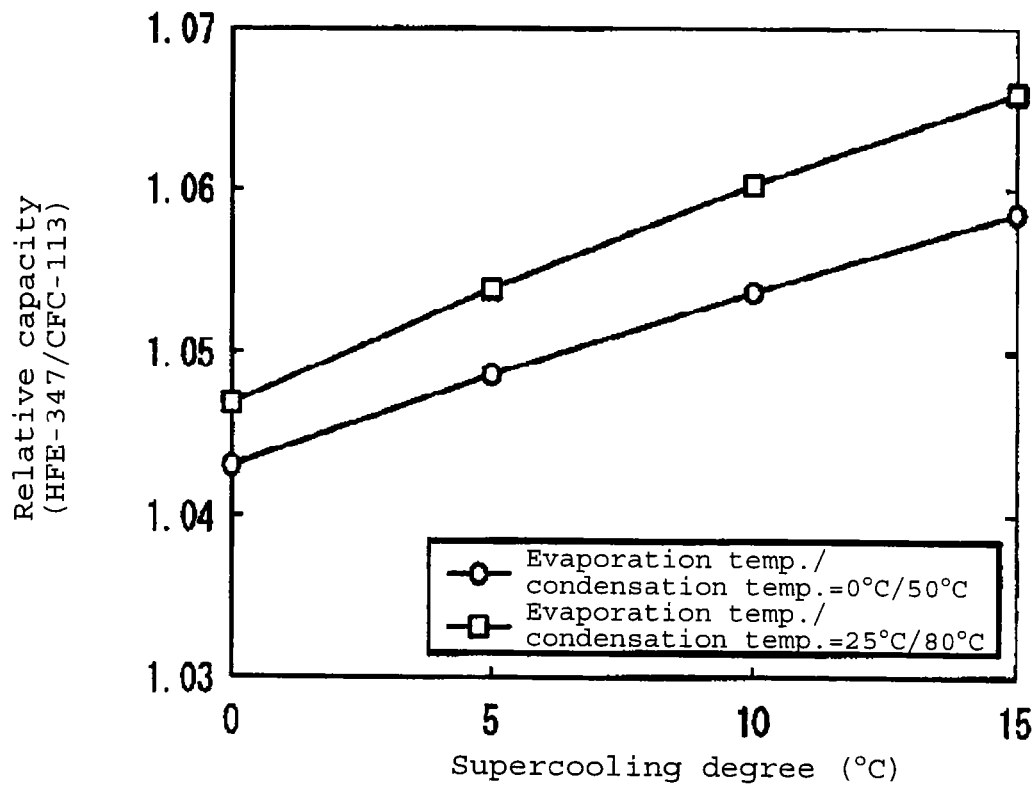
FIG. 10 is a graph showing the relative capacity (HFE-347/CFC-113) in the heat pump capacity at each supercooling degree when evaporation temperature/condensation temperature=0° C./50° C. or evaporation temperature/condensation temperature=25° C./80° C.

Further, FIG. 10 shows the relative capacity (HFE-347/CFC-113) of the heat pump capacity at each supercooling degree when evaporation temperature/condensation temperature=0° C./50° C., or evaporation temperature/condensation temperature=25° C./80° C.

From the results in FIG. 9, it was confirmed that is with HFE-347, the efficiency can be improved over CFC-113 by adjusting the supercooling degree to at least 10° C.

From the results in FIG. 10, it was confirmed that with HFE-347, under any condition, the relative capacity is at least 1, and the heat pump capacity is superior to CFC-113.

Example 5

The refrigeration capacity and the refrigeration cycle efficiency (COP) were evaluated in a case where HFE-347 was applied to the heat pump cycle system 20 in FIG. 4.

The evaluations were carried out under the conditions as disclosed on page 35 of Patent Document 2. However, "evaporation temperature 4.4° C." was the evaporation temperature of HFE-347 in the evaporator 24, "cooler temperature 43.3° C." was the condensation temperature of HFE-347 in the condenser 22, "liquid supercooling temperature 5.5° C." was supercooling degree–inlet temperature of the expansion valve 23=condensation temperature–supercooling degree, "return gas temperature 23.8° C." was the inlet temperature of the compressor 21, and the compressor efficiency was 70%.

The refrigeration cycle efficiency (COP) and the refrigeration capacity are shown in Table 1.

Example 6

The power generation capacity and the Rankine cycle efficiency were evaluated in the same manner as in Example 5 except that CFC-113 was used instead of HFE-347. The refrigeration cycle efficiency (COP) and the refrigeration capacity are shown in Table 1. Further, the relative efficiency (HFE-347/CFC-113) of the heat pump cycle efficiency, and the relative capacity (HFE-347/CFC-113) of the heat pump capacity are shown in Table 1.

TABLE 1

| | Evaporation pressure kPa | Condensation pressure kPa | COP | Relative COP | Capacity kJ/m³ | Relative capacity |
|---|---|---|---|---|---|---|
| HFE-347 | 11.7 | 65.3 | 4.58 | 0.99 | 136.1 | 0.69 |
| CFC-113 | 18.5 | 87.7 | 4.59 | 1.0 | 197.5 | 1.0 |

Further, the refrigeration cycle efficiencies (COP) and the refrigeration capacities (abilities) of 347mcfEβγ and 347mcfEγδ in Table 3 of Patent Document 2, and their relative ratios to CFC-113 are shown in Table 2.

TABLE 2

| | Evaporation pressure kPa | Condensation pressure kPa | COP | Relative COP | Capacity kW | Relative capacity |
|---|---|---|---|---|---|---|
| 347 mcfEβγ | 19 | 95 | 4.04 | 0.97 | 0.30 | 1.15 |
| 347 mcfEγδ | 18 | 94 | 4.04 | 0.97 | 0.29 | 1.12 |
| CFC-113 | 19 | 88 | 4.18 | 1.0 | 0.26 | 1.0 |

With respect to the values for the evaporation pressure and the condensation pressure of CFC-113, the values in this Example (18.5 kPa, and 87.7 kPa) and the values in Patent Document 2 (19 kPa, and 88 kPa) agreed very well without any substantial difference in comparison.

On the other hand, with respect to the value for COP of CFC-113, the value in this Example (4.59) and the value in Patent Document 2 (4.18) differed substantially and showed a result that COP obtained by the apparatus in this Example had high efficiency as compared with the apparatus of Patent Document 2.

In view of the above viewpoint, HFE-347 was compared with 347mcfEβγ and 347mcfEγδ.

With respect to the values for the evaporation pressure and the condensation pressure, the values of HFE-347 in this Example (11.7 kPa, and 65.3 kPa) showed a result substantially different from the values of 347mcfEβγ (19 kPa, and 95 kPa) and the values of 347mcfEγδ (18 kPa, and 94 kPa) in Patent Document 2. From the above results relating to the pressures of CFC-113, there is no substantial difference in the pressures between this Example and Patent Document 2, and from this fact, it is evident that HFE-347 in this Example is a substance different from 347mcfEβγ and 347mcfEγδ in Patent Document 2.

With respect to the capacity and COP, comparison can not be made by the absolute values, and therefore, comparison was made by the relative values to CFC-113. Further, with respect to the capacity, the absolute value (by kW) can not be obtained unless the size of the compression machine is specified. Therefore, the numerical values were relatively compared on the assumption that the extrusion volume of the compression machine was 1 m³/h.

As a result, with respect to COP, when the value (0.99) of HFE-347 was compared with the value (0.97) of 347mcfEβγ and 347mcfEγδ in Patent Document 2, HFE-347 was slightly better.

With respect to the capacity, when the value (0.69) of HFE-347 was compared with the values (1.15, and 1.12) of 347mcfEβγ and 347mcfEγδ in Patent Document 2, 347mcfEβγ and 347mcfEγδ were better.

With respect to the pressure, it was found that HFE-347 having a smaller pressure value is more advantageous from the viewpoint of the installation cost, since the pressure resistance of installation can be set to be lower.

In summary of the foregoing, it is evident that HFE-347 is better from the viewpoint of the installation cost and efficiency. On the other hand, from the viewpoint of the capacity, HFE-347 showed a disadvantageous result, but it is considered to be superior when the capacity per unit mass is taken into account.

INDUSTRIAL APPLICABILITY

The working fluid for a heat cycle of the present invention is non-flammable, little influential to the environment and excellent in the heat cycle characteristics, and it is thus useful as a working fluid for a Rankine cycle system, a heat pump cycle system or a refrigeration cycle system. It is particularly suitable for a Rankine cycle system intended to recover heat from geothermal energy, solar heat or waste heat in an intermediate or high temperature range at a level of from 50 to 200° C., and for a heat pump cycle system intended for a take-out temperature of at least 50° C.

The entire disclosure of Japanese Patent Application No. 2006-069128 filed on Mar. 14, 2006 including specification, claims, drawings and summary is incorporated herein by reference in its entirety.

What is claimed is:

1. A working fluid for a heat cycle, comprising:
   1,1,2,2-tetrafluoroethyl-2,2,2-trifluoroethyl ether (HFE-347); and
   at least one $C_{1-4}$ alcohol;
   wherein
   the mass % of the 1,1,2,2-tetrafluoroethyl-2,2,2-trifluoroethyl ether is at least 90%, and
   the mass % of the $C_{1-4}$ alcohol is in the range of from greater than 0 to 10%.

2. The working fluid for a heat cycle according to claim 1, wherein the at least one $C_{1-4}$ alcohol is selected from the group consisting of methanol, ethanol and isopropanol.

3. The working fluid for a heat cycle according to claim 1, which further comprises a stabilizer and the concentration of the stabilizer is from greater than 0 to at most 5 mass %.

4. The working fluid for a heat cycle according to claim 3, wherein the stabilizer is at least one member selected from the group consisting of an oxidation resistance improving agent, a heat resistance improving agent and a metal deactivator.

5. A Rankine cycle system comprising the working fluid for a heat cycle as defined in claim 1.

6. A heat pump cycle system comprising the working fluid for a heat cycle as defined in claim 1.

7. A refrigeration cycle system comprising the working fluid for a heat cycle as defined in claim 1.

8. A working fluid for a heat cycle, consisting of:
   at least 90 mass % 1,1,2,2-tetrafluoroethyl-2,2,2-trifluoroethyl ether (HFE-347); and
   from greater than 0 to 10 mass % of at least one $C_{1-4}$ alcohol.

9. The working fluid according to claim 8, wherein the $C_{1-4}$ alcohol is at least one selected from the group consisting of methanol, ethanol and isopropanol.

10. A working fluid for a heat cycle, consisting of:
    at least 90 mass % 1,1,2,2-tetrafluoroethyl-2,2,2-trifluoroethyl ether (HFE-347);
    from greater than 0 to 10 mass % of at least one $C_{1-4}$ alcohol; and
    at most 5 mass % of at least one stabilizer selected from the group consisting of an oxidation resistance improving agent, a heat resistance improving agent and a metal deactivator.

11. The working fluid according to claim 10, wherein the $C_{1-4}$ alcohol is at least one selected from the group consisting of methanol, ethanol and isopropanol.

12. The working fluid according to claim 10, wherein the at least one stabilizer is an oxidation resistance-improving agent or heat resistance improving agent selected from the group consisting of N,N'-diphenylphenylenediamine, p-octyldiphenylamine, p,p'-dioctyldiphenylamine, N-phenyl-1-naphthylamine, N-phenyl-2-naphtylamine, N-(p-dodecyl)phenyl-2-naphthylamine, di-1-naphthylamine, di-2-naphthylamine, N-alkylphenothiazine, 6-(t-butyl)phenol, 2,6-di-(t-butyl)phenol, 4-methyl-2,6-di-(t-butyl)phenol and 4,4'-methylenebis(2,6-di-t-butylphenol).

13. The working fluid according to claim 10, wherein the at least one stabilizer is a metal deactivator selected from the group consisting of imidazole, benzimidazole, 2-mercaptobenzothiazole, 2,5-dimethylcaptothiadiazole, salicylidinepropylenediamine, pyrazole, benzotriazole, tolutriazole, 2-methylbenzamidazole, 3,5-dimethylpyrazole, methylenebis-benzotriazole, an organic acid or an ester thereof, a primary, secondary or tertiary aliphatic amine, an amine salt of an organic or inorganic acid, a heterocyclic nitrogen-containing compound and an amine salt of an alkyl phosphate.

* * * * *